(12) United States Patent
Heinrich

(10) Patent No.: US 10,377,338 B2
(45) Date of Patent: Aug. 13, 2019

(54) DEVICE AT LEAST FOR MOVING A MASS, AND VEHICLE HAVING SUCH A DEVICE

(71) Applicant: DAIMLER AG, Stuttgart (DE)

(72) Inventor: Till Heinrich, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 172 days.

(21) Appl. No.: 15/328,164

(22) PCT Filed: Jun. 24, 2015

(86) PCT No.: PCT/EP2015/001274
§ 371 (c)(1),
(2) Date: Jan. 23, 2017

(87) PCT Pub. No.: WO2016/012071
PCT Pub. Date: Jan. 28, 2016

(65) Prior Publication Data
US 2017/0210335 A1    Jul. 27, 2017

(30) Foreign Application Priority Data

Jul. 24, 2014 (DE) ........................ 10 2014 011 013

(51) Int. Cl.
*B60R 21/36* (2011.01)
*B60R 21/38* (2011.01)
*B60R 21/239* (2006.01)
*B60R 21/2338* (2011.01)

(52) U.S. Cl.
CPC ............ *B60R 21/36* (2013.01); *B60R 21/239* (2013.01); *B60R 21/38* (2013.01); *B60R 2021/2395* (2013.01); *B60R 2021/23388* (2013.01)

(58) Field of Classification Search
CPC .......... B60R 21/36; B60R 21/38; B60R 21/34
USPC .................................................. 180/271, 274
See application file for complete search history.

(56) References Cited

U.S. PATENT DOCUMENTS

| | | | |
|---|---|---|---|
| 5,997,037 A * | 12/1999 | Hill | ........................ B60R 21/201 280/728.1 |
| 7,025,164 B2 | 4/2006 | Takimoto | |
| 2009/0001698 A1* | 1/2009 | Kim | ..................... B60R 21/2338 280/737 |

(Continued)

FOREIGN PATENT DOCUMENTS

| | | |
|---|---|---|
| CN | 1446718 A | 10/2003 |
| CN | 1931638 A | 3/2007 |
| DE | 4442543 A1 | 1/1996 |

(Continued)

OTHER PUBLICATIONS

Office Action dated Apr. 26, 2018 in related CN Application No. 201580040917.7.

(Continued)

*Primary Examiner* — Keith J Frisby
(74) *Attorney, Agent, or Firm* — Patent Portfolio Builders PLLC

(57) ABSTRACT

A device at least for moving a mass includes a hollow cylindrical airbag fluidically coupled to a gas generator. The airbag is arranged fixedly with one end on an object and a traction element is fixed in the region of an opposite end. The mass to be moved is arranged on the traction element. When the airbag unfolds traction is exerted on the traction element in such a way that the mass is able to be moved.

3 Claims, 2 Drawing Sheets

(56) References Cited

U.S. PATENT DOCUMENTS

Figure 1:
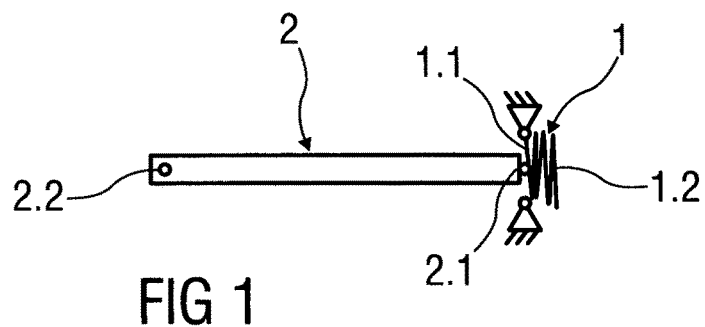

2015/0375711 A1\* 12/2015 Umehara .............. B60R 21/239
                                                                       280/740

FOREIGN PATENT DOCUMENTS

| DE | 10239933 A1 | 3/2004 |
| --- | --- | --- |
| DE | 202004014928 U1 | 12/2004 |
| DE | 10353448 B3 | 6/2005 |
| JP | S62266207 A | 11/1987 |
| WO | 2014032999 A1 | 3/2014 |

OTHER PUBLICATIONS

International Search Report dated Oct. 29, 2015 in related International Application No. PCT/EP2015/001274.
Written Opinion dated Oct. 29, 2015 in related International Application No. PCT/EP2015/001274.
Office Action dated Jul. 7, 2017 in related DE Application No. 10 2014 011 013.3.
Examination Report dated Sep. 13, 2017 in related EP Application No. 15 731 254.7 (reference DE 103 53 448 was previously cited in an IDS on Jul. 25, 2017).

\* cited by examiner

DEVICE AT LEAST FOR MOVING A MASS, AND VEHICLE HAVING SUCH A DEVICE

BACKGROUND AND SUMMARY OF THE INVENTION

Exemplary embodiments of the invention relate to a device at least for moving a mass and a vehicle having such a device.

A motor is known from prior art as a device for moving a mass.

Exemplary embodiments of the invention are directed to an improved device for moving a mass compared to prior art.

According to one aspect of the invention a device at least for moving a mass comprises a hollow cylindrical airbag that is fluidically coupled to a gas generator, the airbag being arranged with one end fixed to an object, wherein a traction element is fixed in the region of a second end, the mass to be moved being arranged on the traction element, wherein, when the airbag unfolds, traction is exerted on the traction element in such a way that the mass is able to be moved.

The airbag takes on a traction function for moving the mass, in particular for shifting vehicle parts in the event of a collision of a vehicle, wherein the airbag carries out the function of an actuator. Thus, the airbag presents a comparatively inexpensive alternative for moving a mass.

At the same time, depending on its positioning, the air bag can take on a protective function for passengers of a vehicle and/or in the event of a person colliding with the vehicle.

BRIEF DESCRIPTION OF THE DRAWING FIGURES

Exemplary embodiments of the invention are illustrated in greater detail below by means of drawings.

Figure 2:
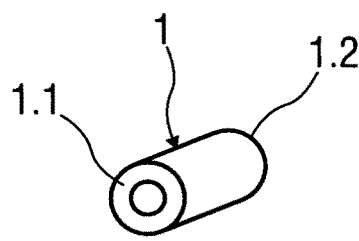
Figure 3:
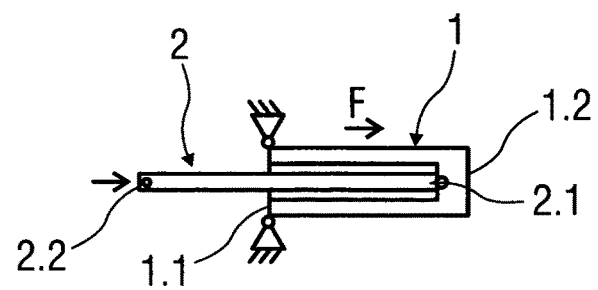
Figure 4:
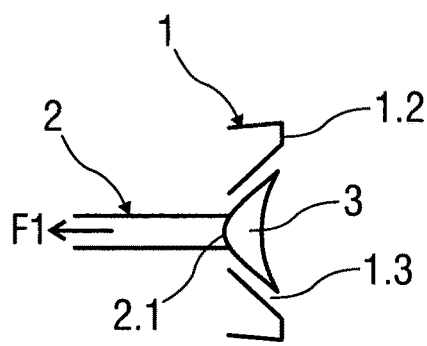
Figure 5:
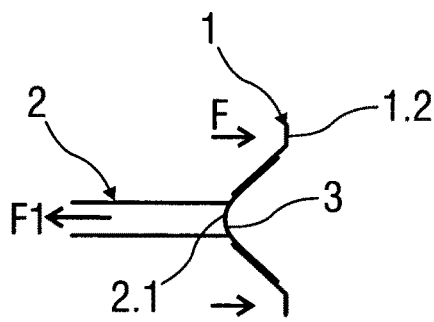
Figure 6:
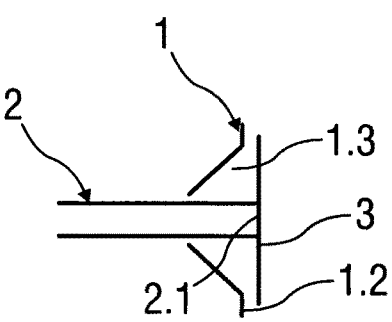
Figure 7:
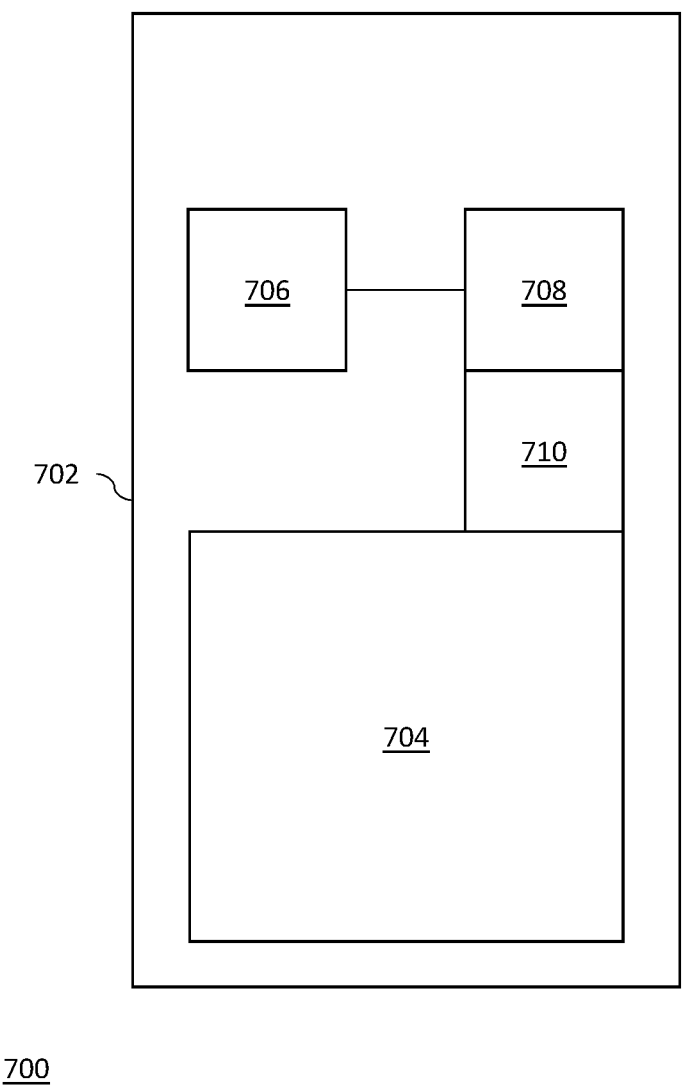

Here are shown:

FIG. 1 schematically, an airbag as a device for moving a mass in the untriggered state, FIG. 2 schematically, a perspective view of the airbag in the triggered state, FIG. 3 schematically, a sectional depiction of the airbag in the triggered state, FIG. 4 schematically, an enlarged cut-out of an airbag in an alternative embodiment, FIG. 5 schematically, a further enlarged cut-out of the airbag according to FIG. 4 with a sealing element in an alternative embodiment, FIG. 6 schematically, an enlarged cut-out of the airbag with the sealing element in the alternative embodiment with open air vent, and FIG. 7 is a highly schematic illustration of a vehicle having a vehicle body, a hood, and a gas generator.

Parts that correspond to one another are provided with the same reference numerals in all figures.

DETAILED DESCRIPTION

FIG. 1 shows an untriggered airbag 1 having a traction element 2 or catch strap as a device for moving a mass, which is not depicted in more detail. In particular, the airbag 1 having the traction element 2 is arranged in or on a vehicle not depicted in more detail. The mass to be moved is a vehicle part, for example a car hood, which is able to be raised on an edge facing the windscreen to protect a person colliding with the car hood and is able to be shifted in the direction of the windscreen.

Alternatively, the airbag 1 having the traction element 2 can be a component of an passenger protection device or a different protection device of the vehicle.

The airbag 1 is formed hollow-cylindrically in the untriggered state, as is shown in more detail in a perspective view in FIG. 2, and with its end 1.1 arranged fixedly on a vehicle part that is not the mass to be moved. For unfolding, the airbag 1 is fluidically coupled with a gas generator not depicted in more detail, the generator in turn being coupled with a control unit, in particular an airbag control device.

The traction element 2 is fixed by its first end 2.1 in the region of an end 1.2 opposite the one end 1.1. Thus, the traction element 2 is fixed to the airbag 1 in such a way that the traction element 2, depending on its length, is located in sections in the triggered state of the airbag 1 within the hollow space, as is presented in more detail in FIG. 3. The mass to be moved is fixed on an opposite second end 2.2 of the traction element 2.

If the mass to be moved is a car hood of the vehicle, the airbag 1 is fixed by the one end 1.1 on a vehicle body and the mass to be moved in the shape of the car hood is fixed to the traction element 2.

If the impact of a person against the vehicle is detected by sensors arranged on the vehicle, a control signal is produced by the control unit and supplied to the gas generator for activation.

The gas generator is triggered, wherein a pyrotechnical propellant is ignited, whereby gas is released and supplied to the airbag 1. The airbag 1 is able to be filled by means of the gas, such that it unfolds.

As described above, the airbag 1 is arranged with one end 1.1 fixed to the vehicle, such that the airbag 1 unfolds in the direction of its opposite end 1.2, so away from the vehicle part and relative to the first end 1.1.

Traction F is exerted on the traction element 2 by unfolding in the longitudinal direction of the airbag 1, such that this is pulled on and the mass to be moved, for example the car hood, is pulled in the direction of the airbag 1. Thus, a route that the mass to be moved covers corresponds substantially to a longitudinal expansion of the airbag 1.

In an alternative embodiment shown in FIGS. 4 to 6, the airbag 1 has a sealable air vent opening 1.3 on its opposite end 1.2.

Thus, a sealing element 3 is fixed to the first end 2.1 of the traction element 2, wherein the traction exerted on the traction element 2 when the airbag 1 unfolds is used for ventilation.

As long as traction is exerted on the traction element 2 and thus on the sealing element 3 adjacent to the air vent opening 1.3, which is greater than a force F1 resulting from an internal pressure of the airbag, the force working against the traction, the sealing element 3 seals the air vent opening 1.3. If the traction reduces, the sealing element 3 is no longer adjacent to the opposite end 1.2, such that the air vent opening 1.3 is opened.

An enlarged cut-out of the airbag 1 with opened air vent opening 1.3 is shown in FIG. 4 and the air vent opening 1.3 is sealed by the adjacent sealing element 3 in an alternative embodiment in FIG. 5.

FIG. 6 shows the enlarged cut-out with opened air vent opening 1.3 and the sealing element 3 fixed to the traction element 2 in the alternative embodiment.

FIG. 7 is a highly schematic illustration of a vehicle having a vehicle body, a hood and a gas generator. Specifically, vehicle 700 has a vehicle body 702, a hood 704, and a gas generator 706. The vehicle 700 also has a device to least for moving the hood 704. The device comprises a hollow, cylindrical airbag 708 fluidically coupled to the gas generator 706. The airbag 708 is fixedly arranged with one end on the vehicle body 702. The device also comprises a traction element 710 fixed in a region of an opposite end of the airbag 708. The hood 704 is fixed to the traction element 710. When the airbag 708 unfolds, traction is exerted on the traction element 710 in such a way that the hood 704 is moved.

Although the present invention has been described above by means of embodiments with reference to the enclosed drawings, it is understood that various changes and developments can be implemented without leaving the scope of the present invention, as it is defined in the enclosed claims.

The invention claimed is:

1. A device at least for moving a hood of a vehicle, the device comprising:
   a hollow, cylindrical airbag fluidically coupled to a gas generator, wherein the airbag is fixedly arranged with one end on a body of the vehicle; and
   a traction element fixed in a region of an opposite end of the airbag, wherein the hood is fixed to the traction element,
   wherein, when the airbag unfolds, traction is exerted on the traction element in such a way that the hood is moved.

2. The device of claim 1, wherein the airbag comprises at least one sealable air vent opening, wherein a sealing element is coupled with a first end of the traction element that is opposite the hood, wherein the at least one air vent opening is closed when the traction exerted on the traction element is greater than a force exerted on the sealing element by an internal pressure of the airbag.

3. A vehicle, comprising:
   a vehicle body;
   a hood;
   a gas generator; and
   a device at least for moving the hood, the device comprising
      a hollow, cylindrical airbag fluidically coupled to the gas generator, wherein the airbag is fixedly arranged with one end on the vehicle body; and
      a traction element fixed in a region of an opposite end of the airbag, wherein the hood is fixed to the traction element,
      wherein, when the airbag unfolds, traction is exerted on the traction element in such a way that the hood is moved.

* * * * *